United States Patent

Baker et al.

Patent Number: 5,620,065
Date of Patent: Apr. 15, 1997

[54] SPRING SET BRAKE

[75] Inventors: William A. Baker, St. Francis; Thomas M. Zwitter, Thiensville, both of Wis.

[73] Assignee: Rexnord Corporation, Milwaukee, Wis.

[21] Appl. No.: 283,649

[22] Filed: Aug. 1, 1994

[51] Int. Cl.⁶ .................................................. F16D 65/12
[52] U.S. Cl. ........................... 188/171; 74/99 A; 188/72.3
[58] Field of Search .............................. 188/72.3, 72.7, 188/72.9, 156, 161, 163, 171; 192/83, 89.21, 90, 114.12; 310/77, 103; 74/99 A

[56] References Cited

U.S. PATENT DOCUMENTS

| | | | |
|---|---|---|---|
| 2,512,565 | 6/1950 | Hallander | 188/171 |
| 2,964,137 | 12/1960 | Luedtke et al. | 188/171 |
| 3,171,515 | 3/1965 | Wolfe | 188/171 |
| 3,357,528 | 12/1967 | Verlinde | 188/171 |
| 3,525,424 | 8/1970 | McCarthy | 188/171 |
| 3,608,679 | 9/1971 | Harrison | 188/171 |
| 3,763,968 | 10/1973 | Noly | 188/171 |
| 4,004,262 | 1/1977 | Grove | 188/138 |
| 4,022,301 | 5/1977 | Hansen | 188/72.7 |
| 4,142,610 | 3/1979 | Alexander et al. | 188/171 |
| 4,156,478 | 5/1979 | Kroeger | 188/171 |
| 4,476,965 | 10/1984 | Brown, Jr. et al. | 188/171 |
| 4,570,758 | 2/1986 | Hendricks | 188/171 |
| 4,828,077 | 5/1989 | Stevens, Jr. | 188/72.9 |

FOREIGN PATENT DOCUMENTS 556985  10/1943  United Kingdom ............... 188/171

Primary Examiner—Robert J. Oberleitner
Assistant Examiner—Chris Schwartz
Attorney, Agent, or Firm—Andrus, Sceales, Starke & Sawall

[57] ABSTRACT

The magnetic air gap in a spring set brake, SSB, is set independently of the length of the legs spacing the pressure plate from the pole face which controls the axial travel length of the armature between a released position engaging the pole face and a braking position pushing a friction disc against the pressure plate. The legs have radially inwardly facing mounting surfaces engaging and retaining the pressure plate. The legs have axially extending line contact guide surfaces for the armature, minimizing magnetic flux leakage through the legs to the armature, and instead concentrating magnetic flux at the pole face to maximize magnetic force attracting the armature. An injection molded friction disc is provided, as well as a keyed hubless design. A manual release mechanism is also provided. An energization coil is provided enabling simplified connection lead bonding.

34 Claims, 10 Drawing Sheets

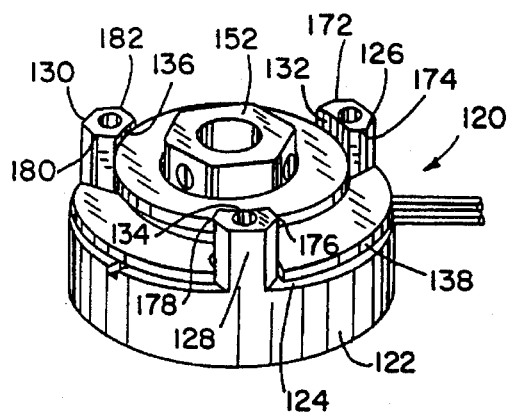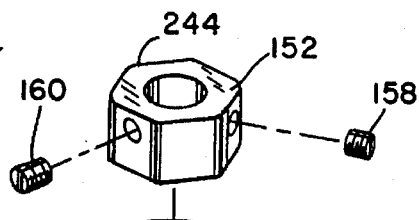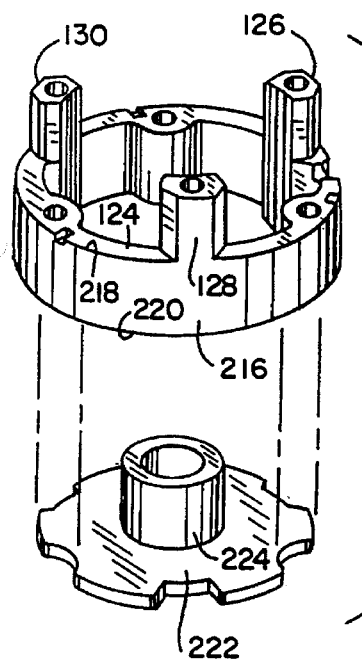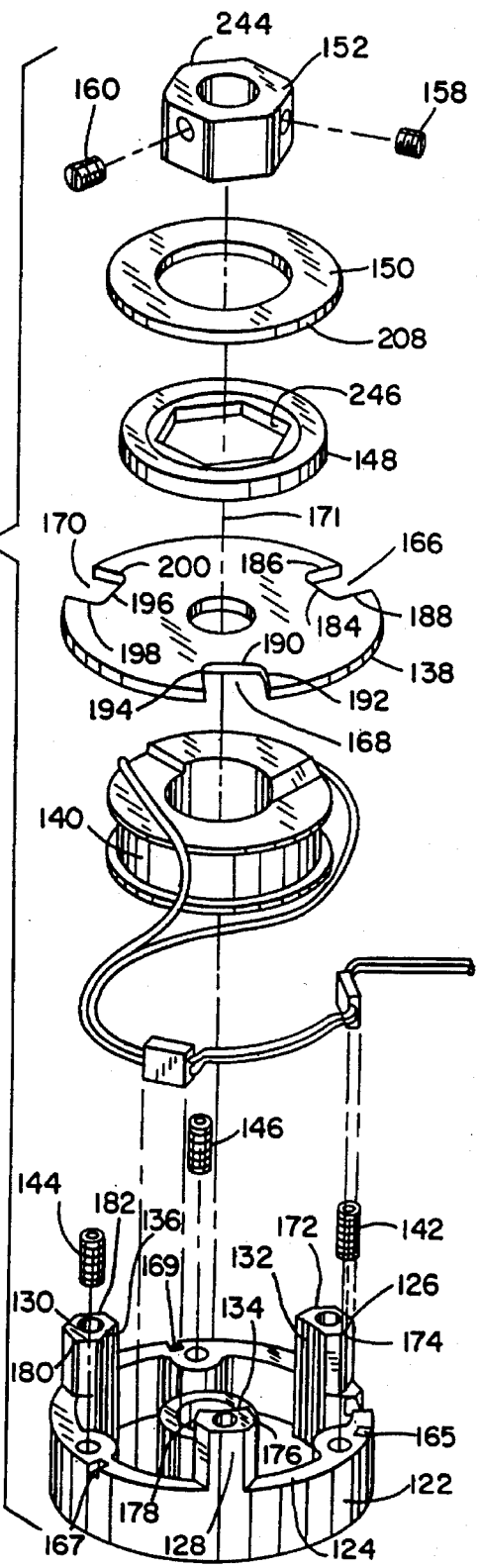

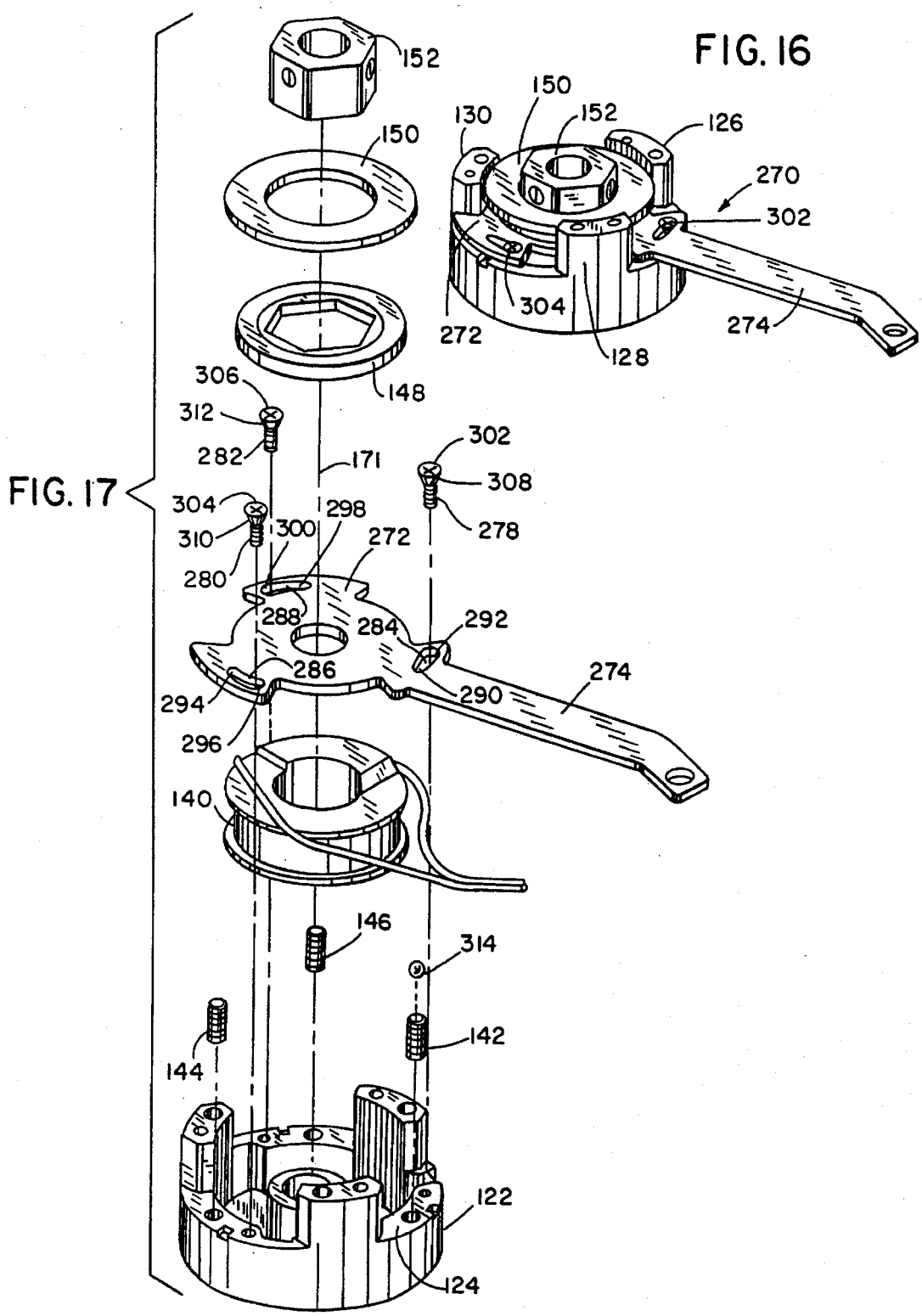

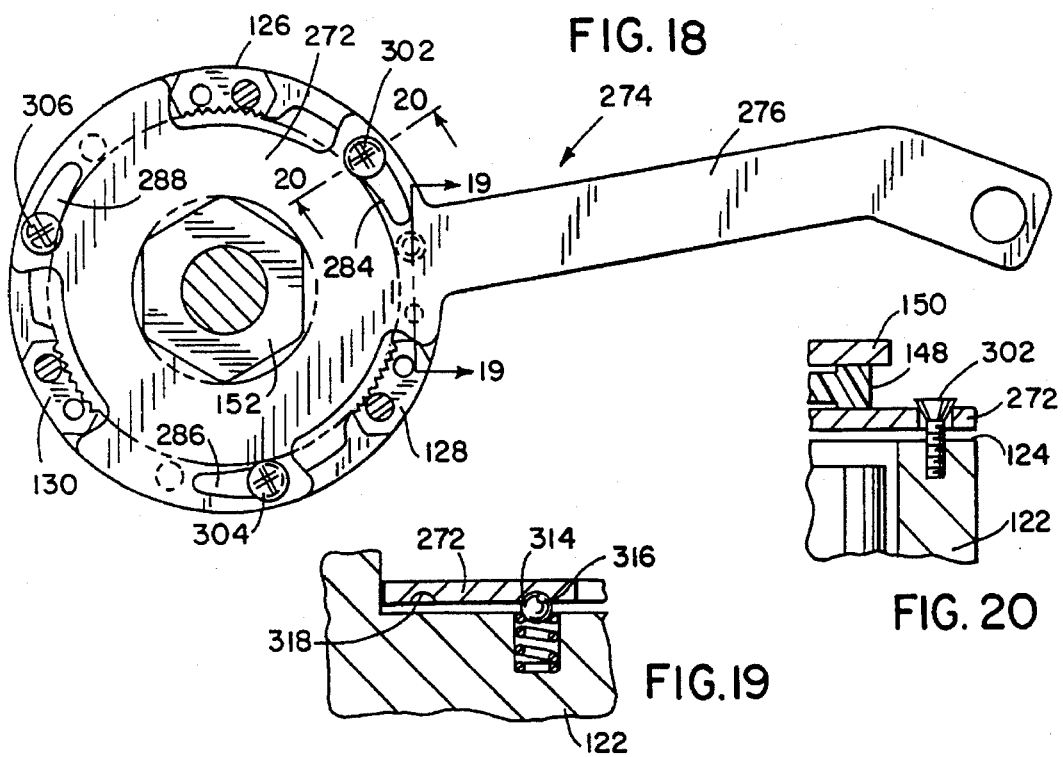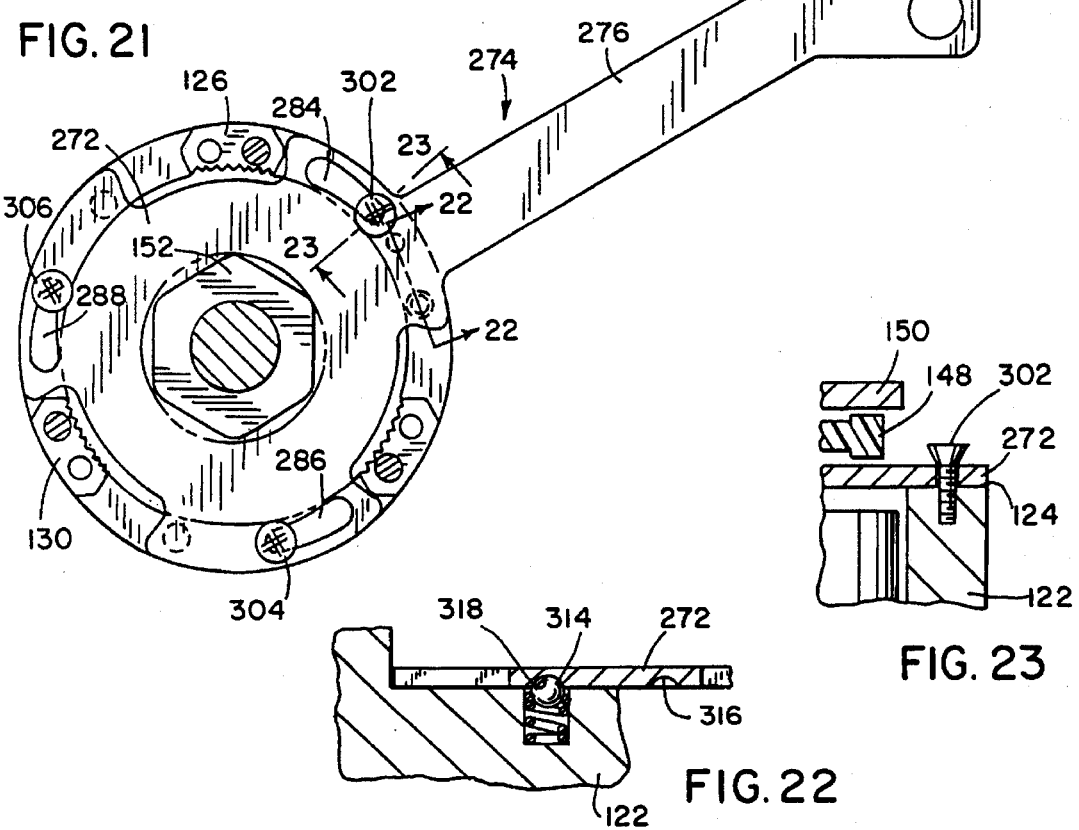

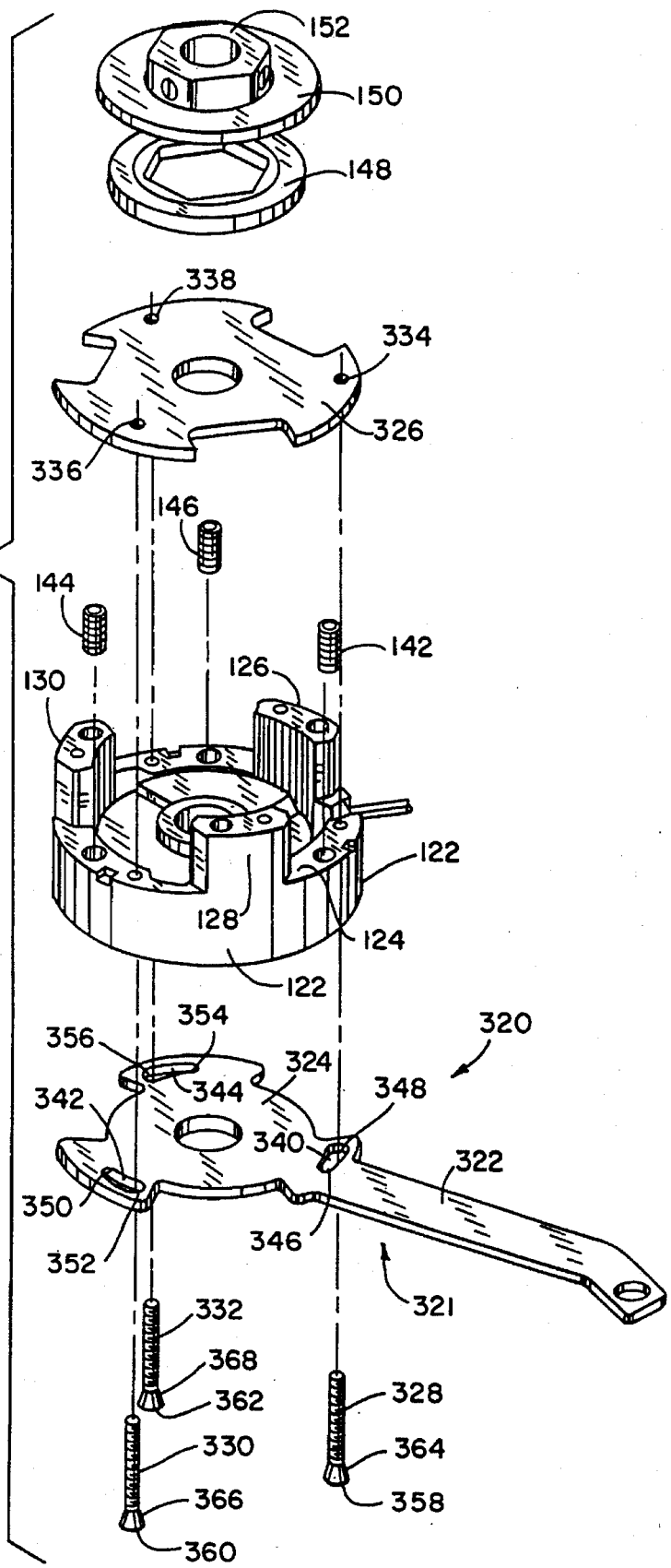

SPRING SET BRAKE

BACKGROUND AND SUMMARY

The invention arose during development efforts relating to an SSB, spring set brake.

A spring set brake includes a magnetically permeable body having a pole face. An armature is axially movable toward and away from the pole face. An energization coil is energizable to magnetically attract the armature toward the pole face. A biasing member biases the armature away from the pole face. A pressure plate is spaced from the pole face by a plurality of legs. A friction disc between the armature and the pressure plate is keyable to an axially extending rotary shaft, such as a motor shaft. Upon de-energization of the coil, the biasing member biases the armature to a braking position pushing the friction disc against the pressure plate to stop rotation of the friction disc and the shaft. The armature in the braking position defines an air gap between the pole face and the armature. Upon energization of the coil, the armature is pulled toward the pole face to a released position releasing the friction disc and permitting rotation of the shaft.

The noted air gap is adjusted by machining the ends of the legs on one or the other of the pole face and pressure plate. This is time consuming and costly, particularly in precision applications because the magnetic air gap must be controlled within close tolerances to enable proper magnetive attractive force. These precision machining operations are undesirable from a manufacturing cost standpoint.

The present invention addresses and solves the noted problem and eliminates the objectionable high cost machining manufacturing steps. The invention provides a simple, cost effective structure and method for setting the magnetic air gap.

In another aspect of the invention, a simplified mounting arrangement for the pressure plate is provided.

In another aspect, axially extending line contact guide surface structure is provided minimizing magnetic flux leakage through the legs to the armature, and instead concentrating magnetic flux at the pole face to maximize magnetic force attracting the armature toward the pole face.

In another aspect, various mounting configurations are enabled in conjunction with a motor frame, including a first configuration with the pressure plate between the motor frame and the friction disc, and a second configuration with the pressure plate on the opposite side of the friction disc from the motor frame.

In another aspect, component part structure is provided for the magnetically permeable body. An annular ring member has legs extending integrally therefrom at one end, and is closed at the other end by a disc base member. The annular ring member has a plurality of internal pockets peripherally spaced therearound and mounting electronic components for the coil.

In another aspect, various configurations are provided for keying the friction disc to the shaft, including keyed hubbed and hubless versions.

In another aspect, an injection molded friction disc is provided.

In another aspect, a manual release mechanism is provided, having a first position permitting axial movement of the armature toward and away from the pole face under the influence of the energization coil and the biasing member, respectively, and having a second position holding the armature in the released position.

In another aspect, an energization coil is provided with a method and structure for simplified connection of wire ends.

BRIEF DESCRIPTION OF THE DRAWINGS

FIG. 6 is an assembled isometric view of a spring set brake in accordance with the invention.

FIG. 7 is an exploded isometric view of the structure of FIG. 6.

FIG. 8 is an exploded isometric view of a portion of the structure of FIG. 7.

FIG. 16 is a view like FIG. 6 and shows a further embodiment.

FIG. 17 is an exploded perspective view of the structure of FIG. 16.

FIG. 18 is a top view of the structure of FIG. 16.

FIG. 19 is a sectional view taken along line 19—19 of FIG. 18.

FIG. 20 is a sectional view taken along line 20—20 of FIG. 18.

FIG. 21 is a view like FIG. 18 but shows the release lever rotated to a different position.

FIG. 22 is a sectional view taken along line 22—22 of FIG. 21.

FIG. 23 is a sectional view taken along line 23—23 of FIG. 21.

FIG. 24 is a view like FIG. 17 and shows an alternate embodiment.

DETAILED DESCRIPTION

Prior Art

Figure 1:
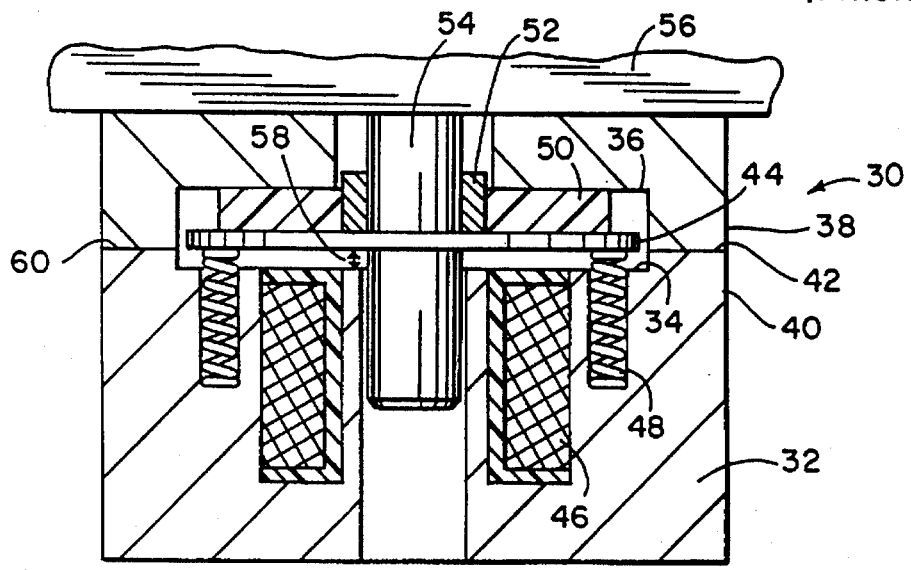
FIG. 1 schematically shows a spring set brake, SSB, known in the prior art.

FIG. 1 shows a spring set brake 30, SSB, known in the prior art. A magnetically permeable body 32 has a pole face 34. A pressure plate 36 is spaced from pole face 34 by a plurality of axially extending legs. Legs 38 extend from pressure plate 36 and meet legs 40 extending from pole face 34. Legs 38 and 40 meet at interface 42. Armature 44 is axially movable toward and away from pole face 34. Energization coil 46 is energizable to magnetically attract armature 44 toward pole face 34. One or more biasing members 48 bias armature 44 away from pole face 34. Friction disc 50 between armature 44 and pressure plate 36 is keyed at hub 52 to rotary shaft 54 extending axially from motor frame 56. Upon de-energization of coil 46, biasing members 48 bias armature 44 axially upwardly in FIG. 1 to a braking position pushing friction disc 50 against pressure plate 36 to stop rotation of friction disc 50 and shaft 54. Armature 44 in the braking position defines a magnetic air gap 58 between pole face 34 and armature 44. Upon energization of coil 46, armature 44 is pulled axially downwardly toward pole face 34 to a released position releasing friction disc 50 and permitting rotation of shaft 54.

Magnetic air gap 58 must be precisely controlled, to effect proper magnetic attractive force thereacross. In the prior art, air gap 58 is set by machining the ends of legs 38 and/or 40 at end surface interface 42. This requires an extra machining step which is costly, and is also subject to tolerance deviations, particularly since the other legs must also be machined, e.g. at surfaces 60, etc. to the same precision to prevent canting or tilting of the armature and different dimensions of magnetic air gap from one side to the other.

PRESENT INVENTION

Figure 2:
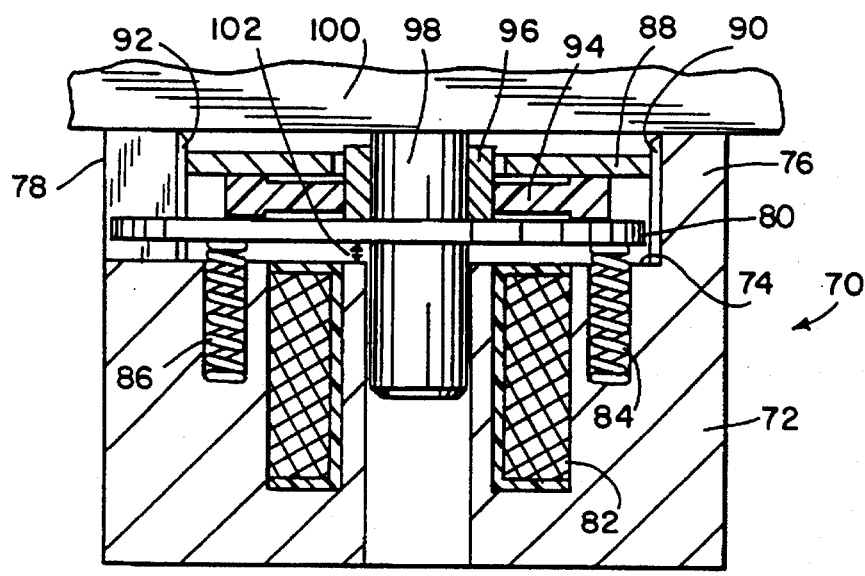
FIG. 2 schematically shows a spring set brake in accordance with the present invention.

FIG. 2 shows a spring set brake 70, SSB, in accordance with the present invention. A magnetically permeable body 72 has pole face 74 and a plurality of legs, preferably three, two of which are shown at 76, 78, extending axially therefrom. An armature 80 is axially movable toward and away from pole face 74. An energization coil 82 is energizable to magnetically attract armature 80 toward pole face 74. One or more biasing members, preferably three, two of which are shown at 84, 86, bias armature 80 away from pole face 74. Pressure plate 88 is mounted to legs 76, 78 at mounting surfaces 90, 92 which extend axially along the legs. Friction disc 94 between armature 80 and pressure plate 88 is keyed by hub 96 to rotary shaft 98 extending axially from motor frame 100. Upon de-energization of coil 82, biasing members 84, 86 bias armature 80 axially upwardly in FIG. 2 to a braking position pushing friction disc 94 against pressure plate 88 to stop rotation of friction disc 94 and shaft 98. Upon energization of coil 82, armature 80 is pulled axially downwardly in FIG. 2 toward pole face 74 to a released position releasing disc 94 and permitting rotation of shaft 98.

Armature 80 in the noted braking position defines a magnetic air gap 102, FIG. 2, between pole face 74 and armature 80. Air gap 102 is set by sliding pressure plate 88 axially along mounting surfaces 90, 92 of legs 76, 78 toward pole face 74. This means of adjustment adjusts air gap 102 independently of the length of the legs. The legs are peripherally spaced around body 72, and mounting surfaces 90, 92 face radially inwardly. In one embodiment, pressure plate 88 is press fit between mounting surfaces 90, 92 to maintain pressure plate 88 at a given axial position, to in turn set air gap 102. In another embodiment, pressure plate 88 is staked between mounting surfaces 90, 92 to maintain the pressure plate at a given axial position.

Figure 3:
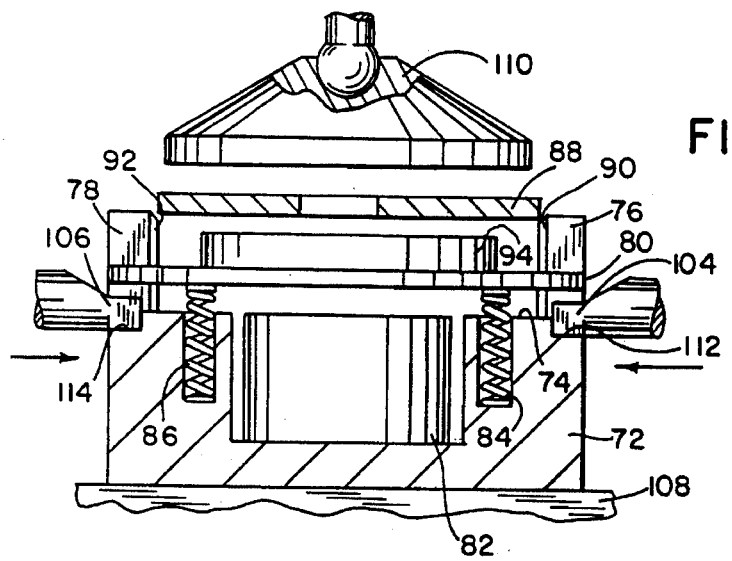
FIG. 3 schematically illustrates a method in accordance with the invention for setting the magnetic air gap of a spring set brake, and adjustment structure for adjusting the air gap.
Figure 4:
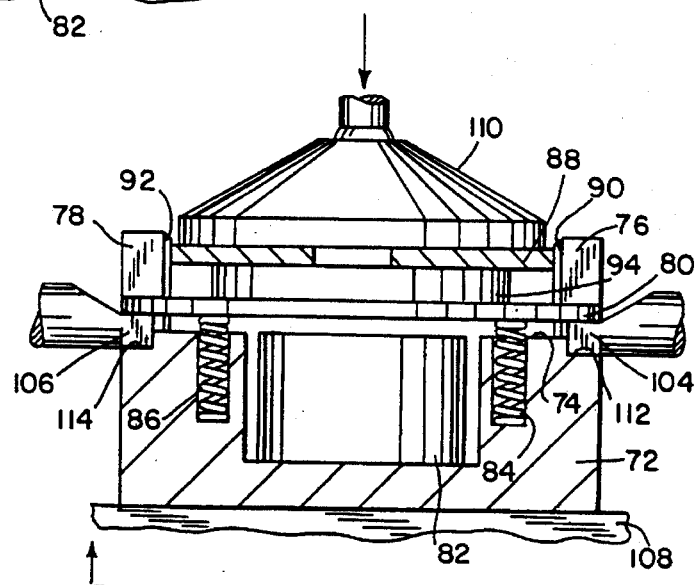
FIG. 4 is like FIG. 3 and shows a further step.
Figure 5:
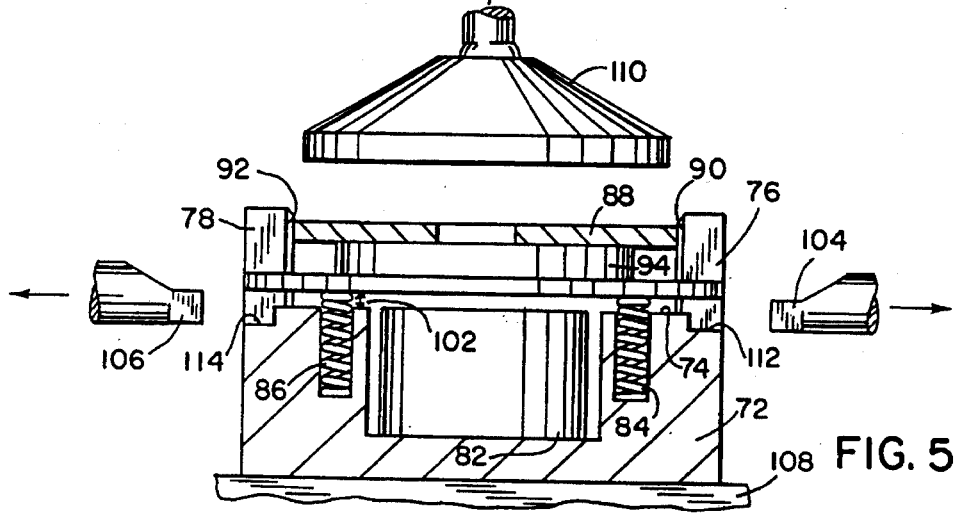
FIG. 5 is like FIG. 4 and shows a further step.

The method of the present invention is illustrated in FIGS. 3–5, which use like reference numerals from FIG. 2 where appropriate to facilitate understanding. Armature 80 is axially spaced from pole face 74 by a plurality of shims, preferably three, two of which are shown at 104, 106. Pressure plate 88 is pushed axially downwardly along mounting surfaces 90, 92 until armature 80 is axially stopped against shims 104, 106, FIG. 4, and friction disc 94 is axially stopped against armature 80, and pressure plate 88 is axially stopped against friction disc 94. During the pushing sequence, body 72 rests on stationary surface 108. Pressure plate 88 is retained in its axially stopped position by its press fit relation with mounting surfaces 90, 92, or by staking, or in any other suitable manner. Shims 104, 106 are removed, FIG. 5, such that armature 80 is axially spaced from pole face 74 by a given axial thickness providing magnetic air gap 102.

Pressure plate 88 is axially pushed along mounting surfaces 90, 92 with a multi-degree-of-freedom ram 110, preferably a ball socket ram, to accommodate deviations and maximize flush engagement of pressure plate 88 against friction disc 94, and friction disc 94 against armature 80, and armature 80 against the three shims, all along stacked parallel engagement surfaces.

Notches 112, 114, etc. are provided in body 72 extending from pole face 74 axially away from armature 80. Shims 104, 106, etc. are inserted into respective notches 112, 114, etc.. The shims extend axially upwardly beyond pole face 74 toward armature 80. The noted given axial thickness providing magnetic air gap 102 is equal to the axial length of the shim such as 104 minus the axial length of the notch such as 112.

FIGS. 6–14 show the preferred embodiment in accordance with the invention. SSB 120, FIG. 6, includes a magnetically permeable body 122, FIGS. 6 and 7, having a pole face 124, and legs 126, 128, 130 extending axially therefrom. Legs 126, 128, 130 have respective mounting surfaces 132, 134, 136 extending axially therealong. Armature 138 is axially movable toward and away from pole face 124. Energization coil 140 is energizable to magnetically attract armature 138 toward pole face 124. Biasing members provided by helical compression springs 142, 144, 146 bias armature 138 away from pole face 124. Biasing springs 142, 144, 146 are peripherally spaced from each other around body 122 and radially spaced outwardly of coil 140 and peripherally interspersed with legs 126, 128, 130. Biasing spring 142 is peripherally spaced between legs 126 and 128. Biasing spring 144 is peripherally spaced between legs 128 and 130. Biasing spring 146 is peripherally spaced between legs 130 and 126. Friction disc 148 is between armature 138 and pressure plate 150, the latter being mounted to mounting surfaces 132, 134, 136 of legs 126, 128, 130 as aforedescribed. Friction disc 148 is keyed by hub 152 to rotary shaft 154, FIG. 9, extending axially from motor frame 156. Hub 152 is mounted to the rotary shaft by set screws 158, 160. Upon de-energization of coil 140, biasing members 142, 144, 146 bias armature 138 axially to a braking position pushing friction disc 148 against pressure plate 150 to stop rotation of the friction disc and rotary shaft. Upon energization of coil 140, armature 138 is axially pulled toward pole face 124 to a released position releasing the friction disc and permitting rotation of the rotary shaft.

Figure 9:
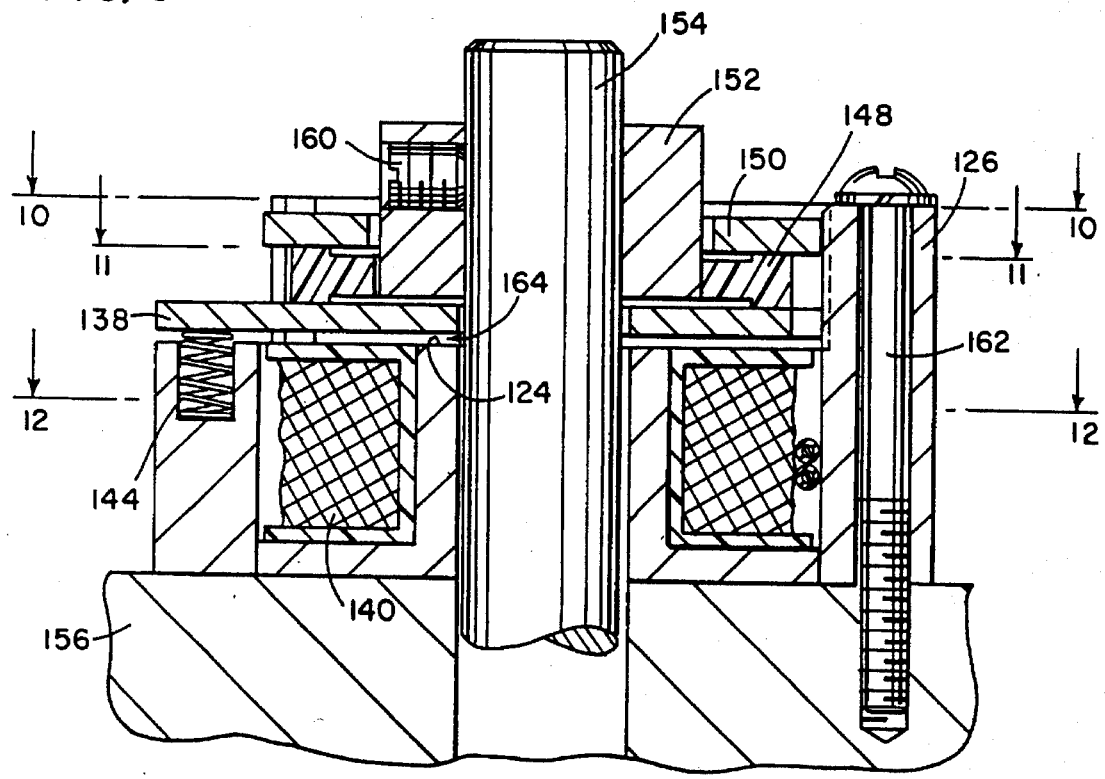
FIG. 9 is a side sectional view of the structure of FIG. 6.
Figure 13:
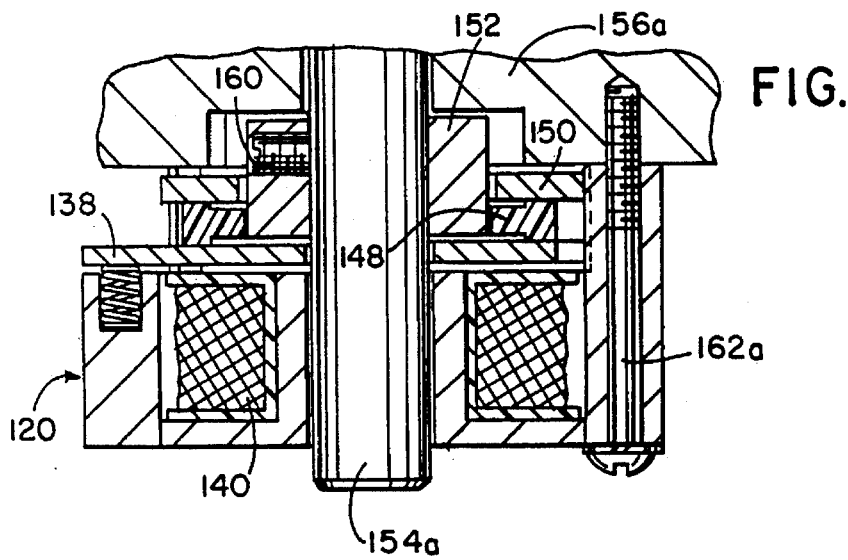
FIG. 13 is a view similar to FIG. 9 but showing an alternate embodiment.
Figure 14:
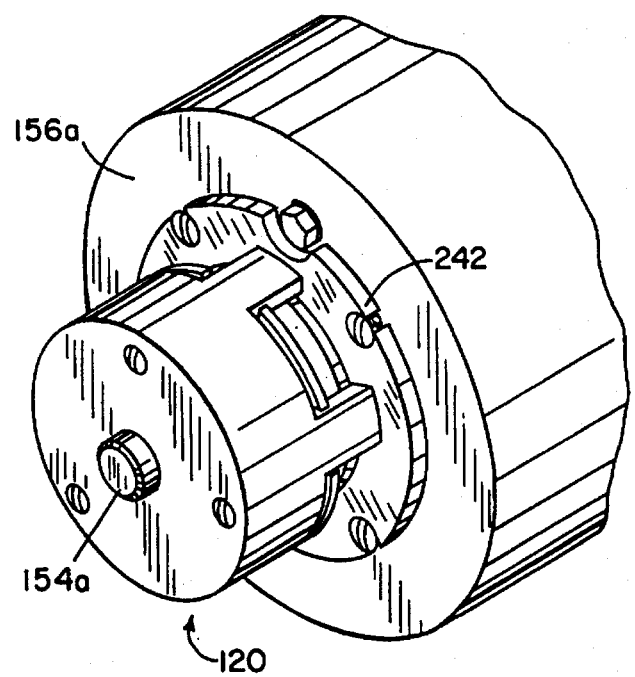
FIG. 14 is an elevational isometric view of structure similar to FIG. 13 and showing a further embodiment.

The structure of FIGS. 6 and 7 may be mounted to a motor frame 156 as shown in FIG. 9, wherein rotary shaft 154 extends from the motor frame, and legs 126, 128, 130 extend from body 122 away from the motor frame. Alternatively, the structure of FIGS. 6 and 7 may be mounted to a motor frame 156a as shown in FIG. 13, wherein rotary shaft 154a extends from the motor frame, and legs 126, 128, 130 extend from body 122 toward the motor frame. In each embodiment, body 122 is mounted to the motor frame by bolts such as 162, FIG. 9, or 162a, FIG. 13, extending through respective legs.

Armature 138 in the noted braking position defines a magnetic air gap 164, FIG. 9, between pole face 124 and armature 138. Air gap 164 is adjustable by sliding pressure plate 150 axially along mounting surfaces 132, 134, 136 of legs 126, 128, 130 toward pole face 124, as aforedescribed. Legs 126, 128, 130 are peripherally spaced around body 122. Mounting surfaces 132, 134, 136 face radially inwardly. Notches 165, 167, 169, FIG. 7, are provided in body 122 extending from pole face 124 axially away from armature 138. Shims such as 104, 106, etc. are inserted into respective notches during the above described manufacturing assembly sequence to set magnetic air gap 164.

Armature 138, FIG. 7, has a plurality of peripheral slots 166, 168, 170 respectively receiving legs 126, 128, 130 to guide axial reciprocal movement of armature 138 therealong and to prevent rotation of armature 138 about the axis of rotation 171 of the rotary shaft. Legs 126, 128, 130 have axially extending line contact guide surfaces 172, 174, 176, 178, 180, 182, FIGS. 6 and 11, adjacent respective mounting surfaces 132, 134, 136. Armature 138 contacts legs 126, 128, 130 substantially only at point contacts along line contact guide surfaces 172, 174, 176, 178, 180, 182, to minimize magnetic flux leakage through legs 126, 128, 130 to armature 138, and instead concentrate magnetic flux at pole face 124, to maximize magnetic force attracting armature 138 toward pole face 124. Line contact guide surfaces 172, 174, 176, 178, 180, 182 face substantially perpendicularly to the radial inward facing direction of mounting surfaces 132, 134, 136.

Figure 11:
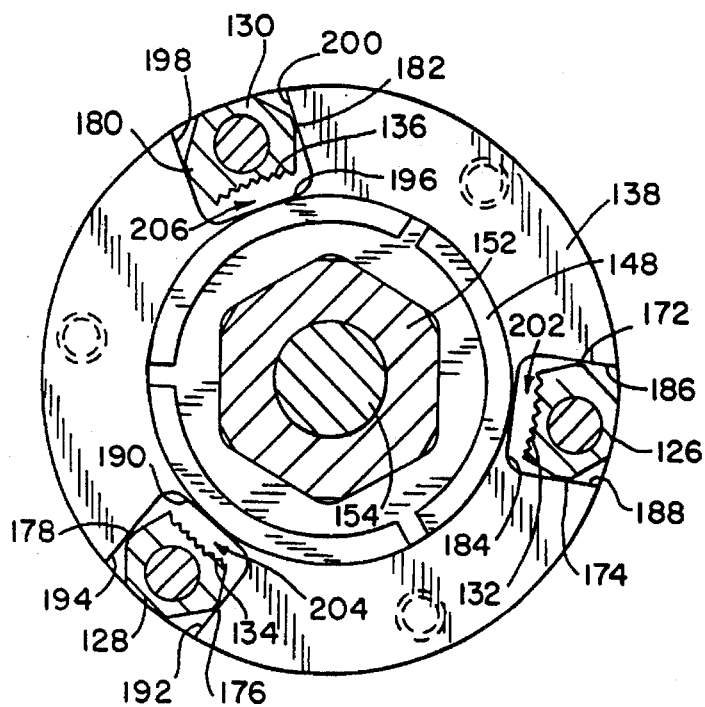
FIG. 11 is a sectional view taken along line 11—11 of FIG. 9.
Figure 12:
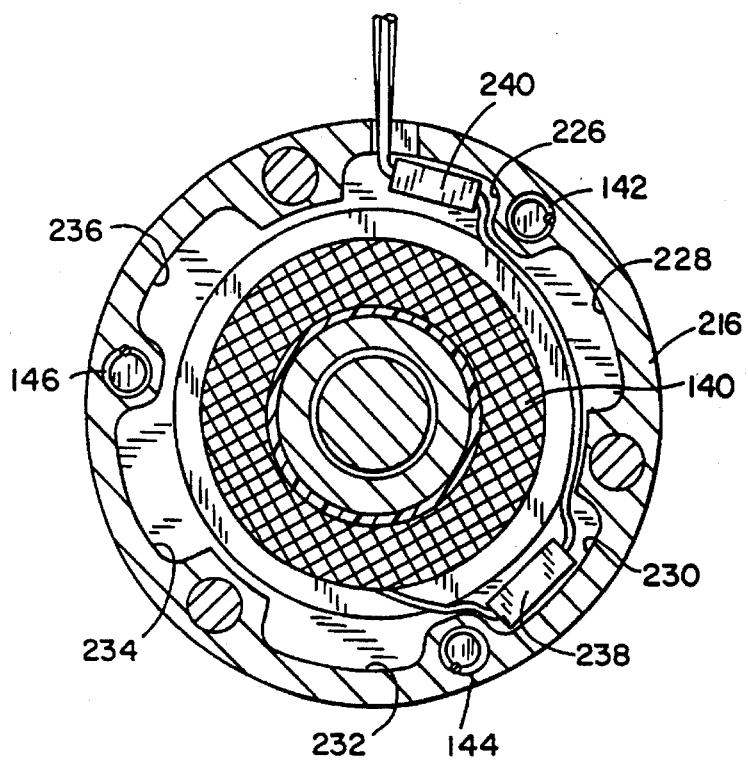
FIG. 12 is a sectional view taken along line 12—12 of FIG. 9.

Each of armature slots 166, 168, 170 has a U-shape, FIGS. 7 and 11, which opens radially outwardly. The U-shape of armature slot 166 is formed by a first armature sidewall 184 forming the central bight of the U, and second and third armature sidewalls 186 and 188 forming the arms of the U. The U-shape of armature slot 168 is formed by a first armature sidewall 190 forming the central bight of the U, and second and third armature sidewalls 192 and 194 forming the arms of the U. The U-shape of armature slot 170 is formed by a first armature sidewall 196 forming the central bight of the U, and second and third armature sidewalls 198 and 200 forming the arms of the U. Sidewall 184 is spaced radially inwardly of mounting surface 132 of leg 126 by a radial gap 202 therebetween. Sidewall 190 is spaced radially inwardly of mounting surface 134 of leg 128 by a radial gap 204 therebetween. Sidewall 196 is spaced radially inwardly of mounting surface 136 of leg 130 by a radial gap 206 therebetween. Sidewalls 186 and 188 contact the sides of leg 126 at respective line contact guide surfaces 172 and 174 for guiding axial reciprocal movement of armature 138. Sidewalls 192 and 194 contact the sides of leg 128 at respective line contact guide surfaces 176 and 178 for guiding axial reciprocal movement of armature 138. Sidewalls 198 and 200 contact the sides of leg 130 at respective line contact guide surfaces 180 and 182 for guiding axial reciprocal movement of armature 138.

Figure 10:
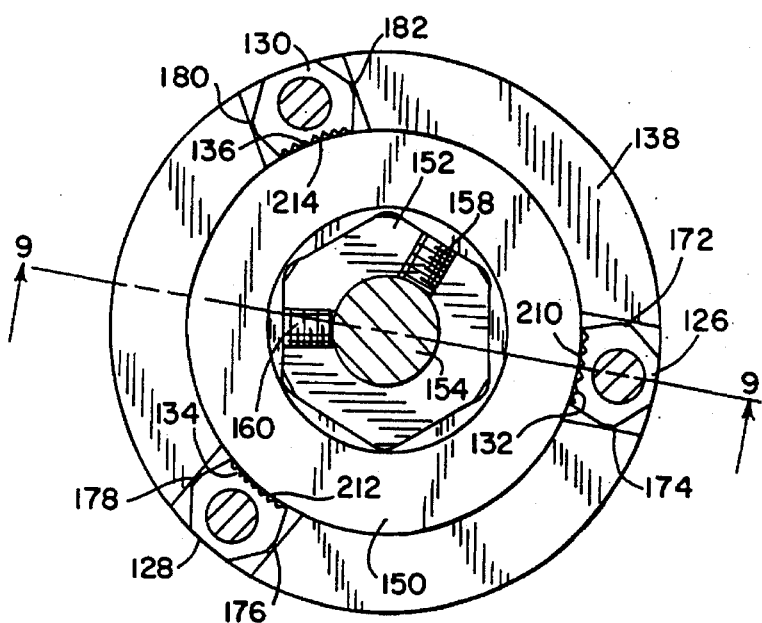
FIG. 10 is a sectional view taken along line 10—10 of FIG. 9.

Pressure plate 150, FIG. 7, is an annular disc having an outer circumferential edge 208 facing radially outwardly and engaging mounting surfaces 132, 134, 136 along respective interfaces 210, 212, 214, FIG. 10, extending perpendicularly to the radial direction.

Magnetically permeable body 122 is formed by an annular ring member 216, FIG. 8, having first and second distally opposite end faces 218 and 220 facing axially in opposite directions. Legs 126, 128, 130 are peripherally spaced around ring member 216 and extend axially beyond end face 218. End face 218 is pole face 124. Magnetically permeable body 122 further includes a base member 222 mounted to ring member 216 at end face 220. Base member 222 is a disc covering and closing ring member 216 at end face 220. Base member 222 includes a central tubular member 224 extending axially into ring member 216 for receiving rotary shaft 154 or 154a therein and supporting coil 140 therearound. Annular ring member 216 and legs 126, 128, 130 are an integrally formed powdered metal singular member. Annular ring member 216 and base member 222 are separately formed members assembled to each other, in press fit relation, or by sinter bonding, or in any other suitable manner. Annular ring member 216, FIG. 12, has a plurality of internal pockets 226, 228, 230, 232, 234, 236 peripherally spaced therearound, interspersed between a respective leg and a respective biasing spring 142, 144, 146. The pockets enable elimination of unnecessary material, and also mount electronic components for coil 140. Pocket 230 mounts a bridge rectifier 238, and pocket 226 mounts an MOV, metal oxide varistor, surge suppressor 240.

As above noted, SSB 120 may be mounted in either of the orientations shown in FIGS. 9 and 13. In FIG. 9, the pressure plate and friction disc are on the opposite side of the armature from the motor frame. In FIG. 13, the pressure plate and friction disc are on the same side of the armature as the motor frame. As a further alternative to the configuration in FIG. 13, the SSB may be mounted to a plate 242, FIG. 14, which plate is mounted to motor frame 156a.

Figure 15:
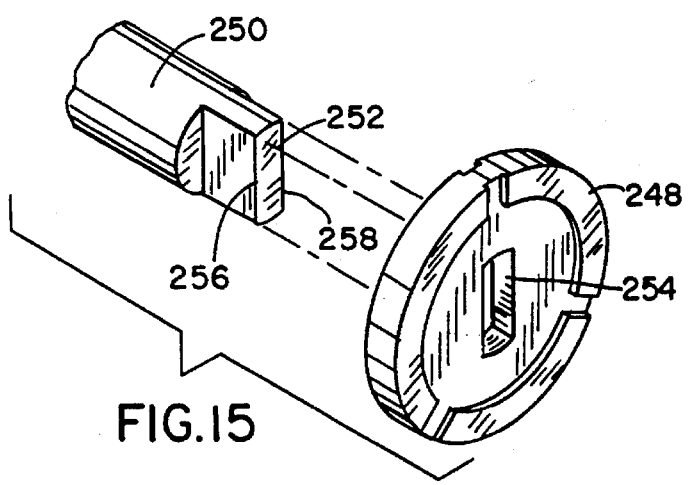
FIG. 15 is an exploded isometric view of a shaft and friction disc.

In the embodiments described thus far, the friction disc is keyed to the rotary shaft by a hub, e.g. 152, FIGS. 7, 9, 13. The hub is fixedly mounted to the rotary shaft, e.g. by set screws 158, 160, FIG. 7. The hub has an outer periphery 244, e.g. hexagonal or some other shape. Friction disc 148 has an inner periphery 246 of the same given configuration and engaging hub 152 in keyed relation. In another embodiment, FIG. 15, friction disc 248 directly engages rotary shaft 250 in keyed hubless relation. Rotary shaft 250 is comparable to rotary shaft 154 or 154a, but has a double-D configured end 252 directly engaging and extending through a central slot 254 in friction disc 248. The end 252 of rotary shaft 250 has diametrically opposite sides 256, 258 each cut from the outer periphery of the shaft in the shape of a D. Sides 256 and 258 are flat and parallel to each other.

In the preferred embodiment, the friction disc 246, 248 is an injection molded member, preferably injection molded polycarbonate, and more particularly injection molded polyphenylene sulfide.

FIGS. 16–23 show a further embodiment, and use like reference numerals from above where appropriate to facilitate understanding. A manual release mechanism 270 has a first position, FIGS. 18–20, permitting axial movement of armature 272 toward and away from pole face 124 under the influence of energization coil 140 and biasing members 142, 144, 146, respectively. The manual release mechanism has a second position, FIGS. 21–23, holding armature 272 in the released position. The release mechanism includes a lever 274 rotatable between the first and second positions about the axis of rotation 171 of the rotary shaft. In the embodiment in FIGS. 16–23, lever 274 is provided by handle 276 and armature 272. Handle 276 extends from armature 272, such that the lever is rotated by rotating handle 276 between the first and second positions, to rotate armature 272 between the first and second positions.

Armature 272 is mounted to body 122 by a camming mechanism such that rotation of the armature from the first to the second position also cams the armature axially toward pole face 124, FIG. 23. The camming mechanism includes a plurality of posts or screws 278, 280, 282, FIG. 17, threaded into body 122 at pole face 124. The posts extend from the body axially upwardly through a plurality of respective slots 284, 286, 288 in armature 272. Each slot has a tapered width along an arc of rotation about the axis 171 of the rotary shaft. Slot 284 is thus tapered along such arc from a narrow width portion 290 to a wider width portion 292. Slot 286 is tapered along such arc from narrower width portion 294 to wider width portion 296. Slot 288 is tapered along such arc from a narrower width portion 298 to a wider width portion 300. Posts 278, 280, 282 have enlarged heads 302, 304, 306, respectively, with frustoconical undersurfaces 308, 310, 312, respectively, engaging the top of armature 272 along the edges of respective slots 284, 286, 288 on the axial side of the armature facing away from pole face 124.

As armature 272 rotates counterclockwise from the position in FIG. 18 to the position in FIG. 21, the narrower portions 290, 294, 298 of the tapered width slots 284, 286, 288 slide along the frustoconical undersurfaces 308, 310, 312 to the narrower portions of the latter, forcing armature 272 to move axially downwardly toward pole face 124. This is the released position of the brake, permitting friction disc 148 and the rotary shaft to rotate, regardless of energization or de-energization of coil 140. In the clockwise rotated position of lever handle 274, frustoconical surfaces 308, 310, 312 are in respective wider width portions 292, 296, 300 of respective slots 284, 286, 288, and armature 272 may move axially toward and away from pole face 124 according to energization and de-energization, respectively, of coil 140.

A detent mechanism tactilely holds the lever in at least one of the rotated positions, preferably both. The detent mechanism is provided by at least one spring-loaded ball 314 in pole face 124. Ball 314 may be loaded by one of the biasing springs such as spring 142, or may be loaded by its own spring. The spring-loaded ball engages recess 316, FIG. 19, in the axial side of armature 272 facing toward pole face 124 when lever 274 is in the noted first position, FIG. 18. Spring-loaded ball 314 engages recess 318, FIG. 22, when lever 274 is in the noted second position, FIG. 21.

FIG. 24 shows an alternate embodiment of the manual release mechanism, and uses like reference numerals from above where appropriate to facilitate understanding. Manual release mechanism 320 includes a lever 321 having a handle portion 322 and a disc portion 324. The lever is on the opposite axial side of body 122 from armature 326, and is connected to armature 326 by a plurality of posts or screws 328, 330, 332 extending through body 122 and threaded into armature 326 at respective threaded holes 334, 336, 338. Lever 322, 324 is mounted to the underside of body 122 by a camming mechanism as aforedescribed, such that upon rotation of the ever from a first to a second position, i.e. counterclockwise in FIG. 24, posts 328, 330, 332 pull armature 326 axially downwardly toward pole face 124.

Posts 328, 330, 332 extend from body 122 downwardly through respective slots 340, 342, 344. The slots have a tapered width along an arc of rotation about the axis 171 of rotation of the rotary shaft. Slot 340 tapers along such arc from a narrower width portion 346 to a wider width portion 348. Slot 342 tapers along such arc from a narrower width portion 350 to a wider width portion 352. Slot 344 tapers along such arc from a narrower width portion 354 to a wider width portion 356. Posts 328, 330, 332 have enlarged heads 358, 360, 362, respectively, with respective frustoconical surfaces, 364, 366, 368 engaging lever disc portion 324 along the edges of the slots on the axial side of the lever facing away from pole face 124. As the lever handle 322 is manually rotated from a first position counterclockwise to a second position, the narrower portions 346, 350, 354 of the tapered width slots 340, 342, 344 slide along frustoconical surfaces 364, 366, 368 to the narrower portions of the latter, pulling armature 326 to move axially downwardly toward pole face 124. This is the released position of the brake, permitting friction disc 148 and the rotary shaft to rotate, regardless of energization or de-energization of coil 140. In the clockwise rotated position of lever handle 322, frustoconical surfaces 364, 366, 368 are in respective wider width portions 348, 352, 356 of respective slots 340, 342, 344, and armature 326 may move axially toward and away from pole face 124 according to energization and de-energization, respectively, of coil 140.

Figure 25:
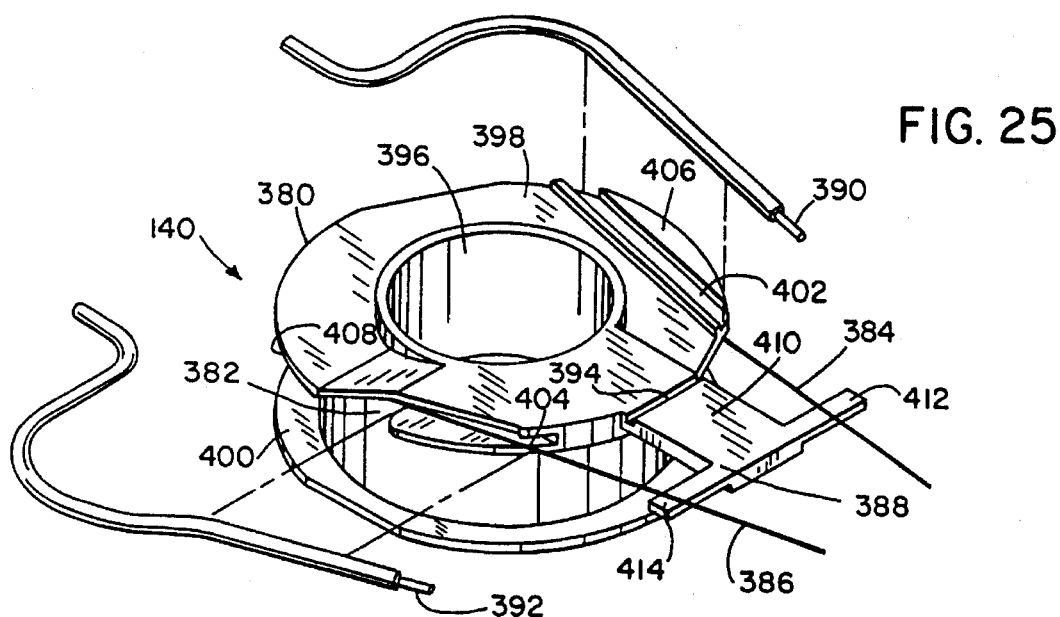
FIG. 25 is an isometric view of an energization coil in accordance with the invention.
Figure 26:
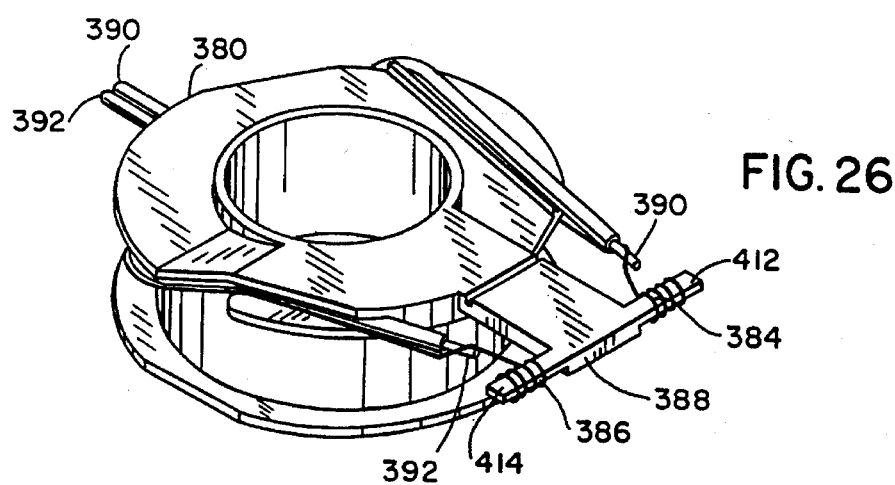
FIG. 26 is a view like FIG. 25 and shows a further assembly step.
Figure 27:
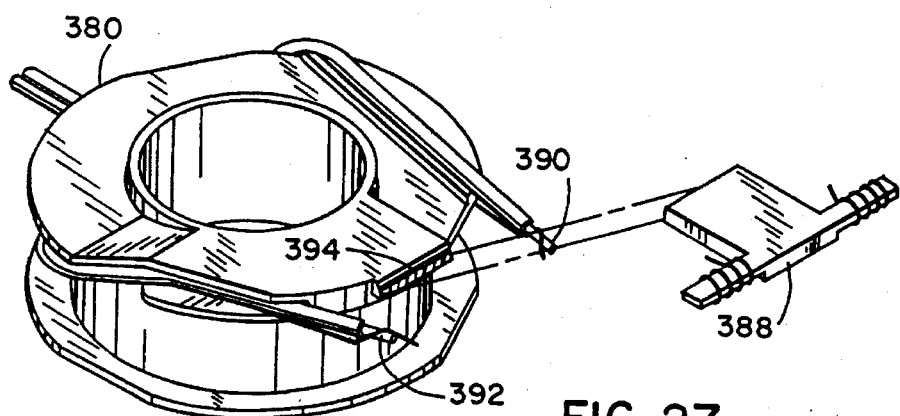
FIG. 27 is a view like FIG. 26 and shows a further assembly step.

FIGS. 25–27 show a further improvement arising out of the invention. Energization coil 140 includes an electrically insulating bobbin 380 and an electrical wrapping wire 382 wound around the bobbin and having first and second ends 384 and 386. The bobbin has a removable tab 388 extending therefrom and supporting wire ends 384 and 386 for connection to respective first and second electrical conductor leads 390 and 392. Bobbin 380 is a plastic member having tab 388 integrally formed therewith and connected thereto at shearable parting line 394. The bobbin includes a central cylindrical core 396 having flanges 398 and 400 at the axial ends thereof and extending radially outwardly therefrom. Tab 388 extends from flange 398 and is joined thereto at shearable parting line 394.

Flange 398 has first and second retention guide channels 402 and 404 formed therealong, each holding a respective one of leads 390 and 392 in alignment with a respective one of wire ends 384 and 386 supported by tab 388. Flange 398 has an upper side 406 facing axially away from flange 400. Flange 398 has a lower side 408 facing axially toward flange 400. Retention guide channel 402 is formed along upper side 406 of flange 398. Retention guide channel 404 is formed along lower side 408 of flange 398. Tab 388 is a T-shaped member having a central stem 410 extending generally radially outwardly from flange 398, and a pair of arms 412, 414 extending oppositely laterally from stem 410 and spaced radially outwardly of flange 398. Wire ends 384 and 386 are attached respectively to arms 412 and 414, e.g. by a few wraps therearound, FIG. 26.

In accordance with the method of the invention, wire ends 384 and 386 are supported on tab arms 412 and 414, and leads 390 and 392 are connected to wire 382. Lead 390 is connected to wire 382 by bonding the lead to the wire adjacent wire end 384. Lead 392 is connected to wire 382 by bonding the lead to the wire adjacent wire end 386. Tab 388 has wire-mounting portions 412 and 414 each spaced from the bobbin. Wire end 384 is mounted to wire-mounting portion 412 by wrapping the wire therearound. Wire end 386 is mounted to wire-mounting portion 414 by wrapping the wire therearound. Lead 390 is bonded to wire 382 at a location along the wire between bobbin 380 and wire-mounting portion 412. Lead 392 is bonded to wire 382 at a location along the wire between bobbin 380 and wire-mounting portion 414. Leads 390 and 392 are preferably bonded to wire 382 at ends 384 and 386 by fusion welding, though other means of bonding or connecting the leads to the wire may be used. After the step of bonding or connecting leads 390 and 392 to the wire, wire ends 384 and 386 are cut off, and tab 388 is detached from the bobbin, FIG. 27. The energization coil, including the method and structure for simplified connection of wire ends, may be used in spring set brake applications, and in other applications.

It is recognized that various equivalents, alternatives and modifications are possible within the scope of the appended claims.

We claim:

1. A spring set brake, comprising:

a magnetically permeable body having a pole face and a plurality of legs extending axially therefrom in integral fixed relation and axially immovable relative thereto, said legs having mounting surfaces extending axially therealong;

an armature axially movable toward and away from said pole face;

an energization coil energizable to magnetically attract said armature toward said pole face;

at least one biasing member biasing said armature away from said pole face;

a pressure plate mounted to said mounting surfaces;

a friction disc between said armature and said pressure plate and keyable to an axially extending rotary shaft such that upon de-energization of said coil, said biasing member biases said armature to a braking position pushing said friction disc against said pressure plate to stop rotation of said disc and said shaft, and such that upon energization of said coil, said armature is pulled toward said pole face to a released position releasing said disc and permitting rotation of said shaft, wherein said armature in said braking position defines an air gap between said pole face and said armature, and wherein said air gap is adjustable by sliding said pressure plate axially along said mounting surfaces of said legs toward said pole face without axially moving said legs relative to said pole face.

2. The invention according to claim 1 wherein said legs are peripherally spaced around said body, and said mounting surfaces face radially inwardly.

3. The invention according to claim 1 wherein said pressure plate is press fit between said mounting surfaces to maintain said pressure plate at a given axial position.

4. The invention according to claim 1 wherein said pressure plate is staked between said mounting surfaces to maintain said pressure plate at a given axial position.

5. The invention according to claim 1 wherein said armature has a plurality of peripheral slots respectively receiving said legs to guide axial reciprocal movement of said armature therealong.

6. The invention according to claim 1 wherein said rotary shaft extends from a motor frame, and said legs extend from said body toward said motor frame.

7. The invention according to claim 1 wherein said body comprises:

an annular ring member having first and second distally opposite end faces facing axially in opposite directions, wherein said legs are peripherally spaced around said ring member and extend axially beyond said first end face; and a base member mounted to said ring member at said second end face.

8. The invention according to claim 7 wherein said first end face is said pole face.

9. The invention according to claim 7 wherein said base member is a disc covering and closing said ring member at said second end face and having a central tubular member extending into said ring member for receiving said shaft therein and supporting said coil therearound.

10. The invention according to claim 1 comprising a hub fixedly mounted to said rotary shaft and having an outer periphery of given configuration, and wherein said friction disc has an inner periphery of said given configuration and engaging said hub in keyed relation.

11. A spring set brake, comprising:

a magnetically permeable body having a pole face and a plurality of legs extending axially therefrom in integral fixed relation and axially immovable relative thereto;

an armature axially movable toward and away from said pole face;

an energization coil energizable to magnetically attract said armature toward said pole face;

at least one biasing member biasing said armature away from said pole face;

a pressure plate mounted to said legs;

a friction disc between said armature and said pressure plate and keyable to an axially extending rotary shaft such that upon de-energization of said coil, said biasing member biases said armature to a braking position pushing said friction disc against said pressure plate to stop rotation of said disc and said shaft, said armature in said braking position defining an air gap between said pole face and said armature, and such that upon energization of said coil, said armature is pulled toward said pole face to a released position releasing said disc and permitting rotation of said shaft;

adjustment means adjusting said air gap independently of the length of said legs and without axially moving said legs relative to said body.

12. A spring set brake, comprising:

a magnetically permeable body having a pole face and a plurality of legs extending axially therefrom, said legs having mounting surfaces extending axially therealong;

an armature axially movable toward and away from said pole face;

an energization coil energizable to magnetically attract said armature toward said pole face;

at least one biasing member biasing said armature away from said pole face;

a pressure plate mounted to said mounting surfaces;

a friction disc between said armature and said pressure plate and keyable to an axially extending rotary shaft such that upon de-energization of said coil, said biasing member biases said armature to a braking position pushing said friction disc against said pressure plate to stop rotation of said disc and said shaft, and such that upon energization of said coil, said armature is pulled toward said pole face to a released position releasing said disc and permitting rotation of said shaft, wherein said armature in said braking position defines an air gap between said pole face and said armature, said air gap is adjustable by sliding said pressure plate axially along said mounting surfaces of said legs toward said pole face, said armature has a plurality of peripheral slots respectively receiving said legs to guide axial reciprocal movement of said armature therealong, said legs have axially extending line contact guide surfaces adjacent said mounting surfaces, such that said armature contacts said legs substantially only along said line contact guide surfaces, to minimize magnetic flux leakage through said legs to said armature, and instead concentrate magnetic flux at said pole face to maximize magnetic force attracting said armature toward said pole face.

13. The invention according to claim 12 wherein said legs are peripherally spaced around said body, said mounting surfaces face radially inwardly, and said line contact guide surfaces face substantially perpendicularly to the radial inward facing direction of said mounting surfaces.

14. The invention according to claim 13 wherein each of said armature slots has a U-shape which opens radially outwardly, the U-shape being formed by a first armature sidewall forming the central bight of the U, and second and third armature sidewalls forming the arms of the U, said first armature sidewall being spaced radially inwardly of said mounting surface of the respective said leg by a radial gap therebetween, said second and third armature sidewalls contacting the sides of said leg at respective said line contact guide surfaces for guiding axial reciprocal movement of said armature.

15. A spring set brake, comprising:

a magnetically permeable body having a pole face and a plurality of legs extending axially therefrom, said legs having mounting surfaces extending axially therealong;

an armature axially movable toward and away from said pole face;

an energization coil energizable to magnetically attract said armature toward said pole face;

at least one biasing member biasing said armature away from said pole face;

a pressure plate mounted to said mounting surfaces;

a friction disc between said armature and said pressure plate and keyable to an axially extending rotary shaft such that upon de-energization of said coil, said biasing member biases said armature to a braking position pushing said friction disc against said pressure plate to stop rotation of said disc and said shaft, and such that upon energization of said coil, said armature is pulled toward said pole face to a released position releasing said disc and permitting rotation of said shaft, wherein said armature in said braking position defines an air gap between said pole face and said armature, said air gap is adjustable by sliding said pressure plate axially along said mounting surfaces of said legs toward said pole face, said legs are peripherally spaced around said body, said mounting surfaces face radially inwardly, said pressure plate comprises an annular disc having an outer circumferential edge facing radially outwardly and engaging said mounting surfaces along respective interfaces extending perpendicularly to said radial direction.

16. A spring set brake, comprising:

a magnetically permeable body having a pole face and a plurality of legs extending axially therefrom, said legs having mounting surfaces extending axially therealong;

an armature axially movable toward and away from said pole face;

an energization coil energizable to magnetically attract said armature toward said pole face;

at least one biasing member biasing said armature away from said pole face;

a pressure plate mounted to said mounting surfaces;

a friction disc between said armature and said pressure plate and keyable to an axially extending rotary shaft such that upon de-energization of said coil, said biasing member biases said armature to a braking position pushing said friction disc against said pressure plate to stop rotation of said disc and said shaft, and such that upon energization of said coil, said armature is pulled toward said pole face to a released position releasing said disc and permitting rotation of said shaft, wherein said body comprises:

an annular ring member having first and second distally opposite end faces facing axially in opposite directions, wherein said legs are peripherally spaced around said ring member and extend axially beyond said first end face; and a base member mounted to said ring member at said second end face, and wherein said annular ring member and said legs are an integrally formed powdered metal singular member, and wherein said annular ring member and said base member separately formed members assembled to each other.

17. A method for setting the magnetic air gap of a spring set brake, comprising:

providing a magnetically permeable body having a pole face and a plurality of legs extending axially therefrom, said legs having mounting surfaces extending axially therealong;

providing an energizable coil;

providing an armature axially movable toward and away from said pole face, wherein energization of said coil magnetically attracts said armature toward said pole face;

providing at least one biasing member biasing said armature away from said pole face;

providing a friction disc on the opposite axial side of said armature from said pole face;

providing a pressure plate on the opposite axial side of said friction disc from said armature;

axially spacing said armature from said pole face by a plurality of shims;

pushing said pressure plate axially along said mounting surfaces of said legs until said armature is axially stopped by said shims, such that said armature is axially stopped against said shims, and said friction disc is axially stopped against said armature, and said pressure plate is axially stopped against said friction disc;

retaining said pressure plate in said axially stopped position;

removing said shims, such that said armature is axially spaced from said pole face by a given axial thickness providing said magnetic air gap, said friction disc being keyable to an axially extending rotary shaft, such that upon de-energization of said coil, said biasing member biases said armature to a braking position pushing said friction disc against said pressure plate to stop rotation of said disc and said shaft, and such that upon energization of said coil, said armature is magnetically pulled toward said pole face to a released position releasing said disc and permitting rotation of said shaft, wherein said armature in said braking position is axially spaced from said pole face by said magnetic air gap.

18. The method according to claim 17 comprising pushing said pressure plate axially along said mounting surfaces with a multi-degree-of-freedom ram to accommodate deviations and maximize flush engagement of said pressure plate against said friction disc, and said friction disc against said armature, and said armature against said one or more shims, all along stacked parallel engagement surfaces.

19. The method according to claim 18 comprising pushing said pressure plate with a ball socket ram.

20. The method according to claim 17 comprising pushing said pressure plate axially along said mounting surfaces in press fit relation between said legs to provide said retaining step.

21. The method according to claim 17 comprising providing notches in said body extending from said pole face axially away from said armature, and comprising inserting said one or more shims in one or more respective said notches, said shims extending axially beyond said pole face toward said armature, said given axial thickness providing said magnetic air gap being equal to the axial length of the shim minus the axial length of the notch.

22. A spring set brake, comprising:
a magnetically permeable body having a pole face;
a pressure plate mounted to said body and axially spaced from said pole face by a plurality of axially extending legs;
an armature axially movable toward and away from said pole face, said armature having a plurality of peripheral slots respectively receiving said legs to guide axial reciprocal movement of said armature therealong;
an energization coil energizable to magnetically attract said armature toward said pole face;
at least one biasing member biasing said armature away from said pole face;
a friction disc between said armature and said pressure plate and keyable to an axially extending rotary shaft, such that upon de-energization of said coil, said biasing member biases said armature to a braking position pushing said friction disc against said pressure plate to stop rotation of said disc and said shaft, and such that upon energization of said coil, said armature is pulled toward said pole face to a released position releasing said disc and permitting rotation of said shaft, wherein said legs have axially extending line contact guide surfaces, such that said armature contacts said legs substantially only along said line contact guide surfaces, to minimize magnetic flux leakage through said legs to said armature, and instead concentrate magnetic flux at said pole face to maximize magnetic force attracting said armature toward said pole face.

23. The invention according to claim 22 comprising a plurality of said biasing members peripherally spaced from each other around said body and radially spaced outwardly of said coil and peripherally interspersed with said legs.

24. The invention according to claim 23 comprising three said legs and three said biasing members, and wherein a first of said biasing members is peripherally spaced between a first and second of said legs, a second of said biasing members is peripherally spaced between said second and the third of said legs, and the third of said biasing members is peripherally spaced between said third and said first of said legs.

25. The invention according to claim 22 wherein each of said armature slots has a U-shape which opens radially outwardly, the U-shape being formed by a first armature sidewall forming the central bight of the U, and second and third armature sidewalls forming the arms of the U, said first armature sidewall being spaced radially inwardly of the respective said leg by a radial gap therebetween, said second and third armature sidewalls contacting the sides of said leg at respective said line contact guide surfaces for guiding said axial reciprocal movement of said armature.

26. A spring set brake, comprising:
a magnetically permeable body having a pole face;
an armature axially movable toward and away from said pole face;
an energization coil energizable to magnetically attract said armature toward said pole face;
at least one biasing member biasing said armature away from said pole face;
a pressure plate mounted to said body and axially spaced from said pole face;
an injection molded polycarbonate friction disc between said armature and said pressure plate and keyable to an axially extending rotary shaft, such that upon de-energization of said coil, said biasing member biases said armature to a braking position pushing said friction disc against said pressure plate to stop rotation of said disc and said shaft, and such that upon energization of said coil, said armature is pulled toward said pole face to a released position releasing said disc and permitting rotation of said shaft.

27. The invention according to claim 26 wherein said friction disc is injection molded polyphenylene sulfide.

28. A spring set brake, comprising:
a magnetically permeable body having a pole face;
an armature axially movable toward and away from said pole face;
an energization coil energizable to magnetically attract said armature toward said pole face;
at least one biasing member biasing said armature away from said pole face;
a pressure plate mounted to said body and axially spaced from said pole face;
a friction disc between said armature and said pressure plate and keyable to an axially extending rotary shaft, such that upon de-energization of said coil, said biasing member biases said armature to a braking position pushing said friction disc against said pressure plate to stop rotation of said disc and said shaft, and such that upon energization of said coil, said armature is pulled toward said pole face to a released position releasing said disc and permitting rotation of said shaft;
said armature being rotatable between a first position permitting axial movement of said armature toward and away from said pole face under the influence of said energization coil and said biasing member, respectively, and a second position holding said armature in said released position.

29. The invention according to claim 28 comprising a detent mechanism tactilely holding said armature in at least one of said rotated positions.

30. A spring set brake, comprising:
a magnetically permeable body having a pole face;
an armature axially movable toward and away from said pole face;
an energization coil energizable to magnetically attract said armature toward said pole face;
at least one biasing member biasing said armature away from said pole face;
a pressure plate mounted to said body and axially spaced from said pole face;
a friction disc between said armature and said pressure plate and keyable to an axially extending rotary shaft, such that upon de-energization of said coil, said biasing member biases said armature to a braking position pushing said friction disc against said pressure plate to stop rotation of said disc and said shaft, and such that upon energization of said coil, said armature is pulled toward said pole face to a released position releasing said disc and permitting rotation of said shaft;

a manual release mechanism having a first position permitting axial movement of said armature toward and away from said pole face under the influence of said energization coil and said biasing member, respectively, and having a second position holding said armature in said released position, wherein said release mechanism comprises a lever rotatable between said first and second positions about the axis of rotation of said rotary shaft, and said armature is rotatable between first and second positions about the axis of rotation of said rotary shaft, and wherein said lever extends from said armature such that rotation of said lever between said first and second positions rotates said armature between said first and second positions.

31. The invention according to claim 30 wherein said armature is mounted to said body by a camming mechanism such that rotation of said armature from said first to said second position also cams said armature axially toward said pole face.

32. The invention according to claim 31 wherein said camming mechanism comprises a plurality of posts extending from said body axially through a plurality of respective slots in said armature, said slots having a tapered width along an arc of rotation about the axis of rotation of said rotary shaft, said posts having enlarged heads with frustoconical surfaces engaging said armature along the edges of said slots on the axial side of said armature facing away from said pole face, such that as said armature rotates from said first position to said second position, the narrower portions of said tapered width slots slide along said frustoconical surfaces to the narrower portions of the latter, forcing said armature to move axially toward said pole face.

33. The invention according to claim 30 comprising a detent mechanism tactilely holding said lever in at least one of said rotated positions.

34. A spring set brake, comprising:

a magnetically permeable body having a pole face;

an armature axially movable toward and away from said pole face;

an energization coil energizable to magnetically attract said armature toward said pole face;

at least one biasing member biasing said armature away from said pole face;

a pressure plate mounted to said body and axially spaced from said pole face;

a friction disc between said armature and said pressure plate and keyable to an axially extending rotary shaft, such that upon de-energization of said coil, said biasing member biases said armature to a braking position pushing said friction disc against said pressure plate to stop rotation of said disc and said shaft, and such that upon energization of said coil, said armature is pulled toward said pole face to a released position releasing said disc and permitting rotation of said shaft;

a manual release mechanism having a first position permitting axial movement of said armature toward and away from said pole face under the influence of said energization coil and said biasing member, respectively, and having a second position holding said armature in said released position, wherein said release mechanism comprises a lever rotatable between said first and second positions about the axis of rotation of said rotary shaft, and comprising a detent mechanism tactilely holding said lever in at least one of said rotated positions, wherein said detect mechanism comprises at least one spring-loaded ball in said pole face, and at least one recess in the axial side of said armature facing toward said pole face.

* * * * *